(12) United States Patent
Song et al.

(10) Patent No.: US 10,421,198 B2
(45) Date of Patent: Sep. 24, 2019

(54) COUNTERBALANCING LINKAGE MECHANISM

(71) Applicants: KOREA UNIVERSITY RESEARCH AND BUSINESS FOUNDATION, Seoul (KR); HYUNDAI MOTOR COMPANY, Seoul (KR); KIA MOTORS CORPORATION, Seoul (KR)

(72) Inventors: Jae-Bok Song, Seoul (KR); Hyun Soo Lee, Seongnam-si (KR); Hwi-su Kim, Seoul (KR); Seung Woo Song, Anyang-si (KR)

(73) Assignees: KOREA UNIVERSITY RESEARCH AND BUSINESS FOUNDATION, Seoul (KR); HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 470 days.

(21) Appl. No.: 15/041,428

(22) Filed: Feb. 11, 2016

(65) Prior Publication Data

US 2016/0236359 A1    Aug. 18, 2016

(30) Foreign Application Priority Data

Feb. 12, 2015    (KR) .................. 10-2015-0021591

(51) Int. Cl.
*B25J 19/00*        (2006.01)
*B25J 9/10*         (2006.01)

(52) U.S. Cl.
CPC ......... *B25J 19/0016* (2013.01); *B25J 9/1065* (2013.01); *Y10S 901/48* (2013.01)

(58) Field of Classification Search
CPC ... B25J 19/0008; B25J 9/1065; B25J 19/0016
See application file for complete search history.

(56) References Cited

U.S. PATENT DOCUMENTS

| 5,528,955 | A | * | 6/1996 | Hannaford | ............... | B25J 9/047 |
| | | | | | | 318/568.1 |
| 2010/0154579 | A1 | * | 6/2010 | Nakamura | ............... | B25J 9/102 |
| | | | | | | 74/490.05 |

(Continued)

FOREIGN PATENT DOCUMENTS

KR         100760846 B1    9/2007
KR    10-2014-0106899 A    9/2014

OTHER PUBLICATIONS

Kang et al., "Manipulator Equipped with Counterbalance Mechanism Based on Gear Unit", Trans. Korean Soc. Mech. Eng. A, vol. 38, No. 3, pp. 289-294, Mar. 2014, with English abstract.

*Primary Examiner* — David M Fenstermacher
(74) *Attorney, Agent, or Firm* — Morgan, Lewis & Bockius LLP

(57) ABSTRACT

A counterbalancing linkage mechanism includes a base link including a first joint; a second link forming a second joint to be rotatably connected to the base link; and a counter balancer having one portion disposed at the second joint and another portion movably disposed at the base link along a length direction of the second link. The counter balancer compensates a gravitational torque generated due to a weight of the second link when the second link rotates on the second joint. A third link is connected to the second link. The counter balancer comprises a counter balancer delivery portion connected to the second link and rotating by the rotation of the second link. A counter balancer driving portion is in contact with the counter balancer delivery portion, linearly moves by the rotation of the counter balancer delivery portion, and compensates the gravitational (Continued)

torque and a load capacity due to interaction with the counter balancer delivery portion.

14 Claims, 27 Drawing Sheets

(56) References Cited

U.S. PATENT DOCUMENTS

| | | | |
|---|---|---|---|
| 2011/0072930 A1* | 3/2011 | Bayer | B25J 19/0012 74/490.01 |
| 2014/0202276 A1* | 7/2014 | Song | B25J 9/046 74/490.05 |
| 2015/0239133 A1* | 8/2015 | Whitney | B25J 19/002 74/490.01 |

* cited by examiner

COUNTERBALANCING LINKAGE MECHANISM

CROSS-REFERENCE TO RELATED APPLICATION

This application claims the benefit of priority to Korean Patent Application No. 10-2015-0021591 filed in the Korean Intellectual Property Office on Feb. 12, 2015, the entire content of which is incorporated herein by reference.

TECHNICAL FIELD

The present disclosure relates to a counterbalancing linkage mechanism that can cooperate with human. More particularly, the present disclosure relates to a counterbalancing linkage mechanism that minimizes a required torque for driving the counterbalancing linkage mechanism and generates an additional compensation torque by mounting a mechanical compensation apparatus for compensating a gravitational torque.

BACKGROUND

Various robots have been utilized for improving, particularly, manufacturing efficiency. Accordingly, cooperation between a worker and a robot is needed. However, since there are many problems such as a collision between the worker and the robot, the robot is in general operated in a secluded area from the worker.

In order to prevent the collision between the worker and the robot during the cooperation, a driving torque of a driving motor for the robot should be minimized.

A gravitational force compensation apparatus for minimizing the driving torque has been used, which mechanically compensates a gravitational force generated by weight of the robot and minimizes the required driving torque.

The gravitational force compensation apparatus may include a weight pendulum mounted at a side opposite to where a force is applied or include a wire for moving linkage mechanism of the robot.

However, the wire may deform or break when the worker collides with the robot. Therefore, there exists a need for an improved gravitational force compensation apparatus that has high reliability and minimizes weight influence of the robot.

Further, when constituent elements of the robot need to be replaced or fixed, the robot needs to be disassembled inconveniently.

Therefore, there exists a new gravitational force compensation apparatus having high reliability and durability.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a counterbalancing linkage mechanism that can cooperate with a human through a counter balancer.

A counterbalancing linkage mechanism according to an exemplary embodiment in the present disclosure includes a base link as a first link including a first joint; a second link forming a second joint to be rotatably connected to the base link in which a center of mass of the second link is spaced apart from the second joint; a counter balancer having one portion disposed at the second joint and the other portion movably disposed at the base link along a length direction of the second link, and compensating a gravitational torque generated due to a weight of the second link when the second link rotates on the second joint; and a third link connected to the second link. The counter balancer comprises: a counter balancer delivery portion connected to the second link and rotating by the rotation of the second link; a counter balancer driving portion contacting the counter balancer delivery portion, linearly moving by the rotation of the counter balancer delivery portion, and compensating the gravitational torque a load capacity due to an interaction with the counter balancer delivery portion.

The counter balancer delivery portion may include: a delivery gear portion moving together with the second link; and a delivery crank portion connected to the delivery gear portion. The delivery crank portion includes a delivery crank coaxially connected to the delivery gear portion, and a delivery roller rotatably connected to and contacting the counter balancer driving portion.

The counter balancer driving portion may include: a moving base frame fixedly mounted at the base link; a moving block linearly moving on the moving base frame and contacting the delivery roller; and a moving elastic portion elastically supporting the moving block toward the delivery crank portion.

The moving elastic portion may include: a moving elastic shaft fixedly mounted at the moving block and extending along a moving direction of the moving block; and a moving elastic member covering an external circumference of the moving elastic shaft and disposed between the moving base frame and the moving block.

The counter balancer driving portion may include a moving motion block dispose at the moving block, and a moving motion rail connected to the moving motion block to relatively move with each other and disposed at the moving base frame to be parallel with the moving elastic shaft.

The moving block may include: a moving block body mounted at the moving motion block; and a moving block plate disposed at the moving block body and contacting the delivery roller.

The second link may include; a second upper link having one end rotatably connected to the base link and the opposite end rotatably connected to the third link; and a second lower link having one end rotatably connected to the base link and the opposite end rotatably connected to the third link. The second lower link may be spaced apart from the second upper link.

The counterbalancing linkage mechanism may further include a second driver supplying a driving torque to the second upper link.

The second lower link may be connected to the counter balancer delivery portion.

The counter balancer delivery portion may include: a delivery gear portion rotating together with the rotational motion of the second link; and a delivery crank portion connected to the delivery gear portion. The delivery gear portion may include: a delivery lower gear coaxially connected to the second lower link; and a delivery upper gear engaged with the delivery lower gear and coaxially connected to the delivery crank portion.

A second upper joint portion is formed at one end of the second upper link and is rotatably connected to the base link. A second lower joint portion is formed at one end of the second lower link and is rotatably connected to the base link.

A third upper joint portion is formed at the opposite end of the second upper link and is rotatably connected to the third link. A third lower joint portion is formed at the opposite end of the second lower link and is rotatably connected to the third link.

The counterbalancing linkage mechanism may further include a fourth link connected to an end portion of the third link and moving on a plane perpendicular to a length direction of the third link.

The counterbalancing linkage mechanism may further include a fifth link disposed at an end portion of the fourth link. The fifth link moves on a plane in parallel with a length direction of the fourth link.

The counterbalancing linkage mechanism may further include a sixth link disposed at an end portion of the fifth link. The sixth link rotates base on a rotation axis of a length direction of the fifth link.

The counterbalancing linkage mechanism may further include a base driver supplying a driving torque to the first joint.

According to the exemplary embodiment in the present disclosure, the counterbalancing linkage mechanism has following effects.

First, since the gravitational torque is compensated by the mechanical counter balancer comprising a gear-crank-roller, it is possible to reduce the capacity of the motors.

Second, since it is easy to compensate the gravitational torque by the weight of links and the weight of the elements connected to the links, the load capacity of robot is maximized.

Third, since the counter balancer compensating the gravitational torque is made of gear-crank-roller structure, durability and reliability are increased.

Fourth, since capacity of motors and reducers is reduced, cost can be reduced and collision safety is improved.

The counterbalancing linkage mechanism according to the present disclosure can completely compensate the gravitational torque changed by the position and posture of the counterbalancing linkage mechanism. That is, the counterbalancing linkage mechanism can make the gravitational torque generated by the weight of links zero when the posture of the counterbalancing linkage mechanism maintains. Further, the counter balancer is comprised of gears and a roller having high reliability such that it is possible to maintain high performance in spite of long usage of the counterbalancing linkage mechanism.

Capacity of a motor and a reducer provided at joints and manufacturing cost can be minimized by applying the counter balancer. Further, it is possible to reduce operating cost using low-capacity motor.

Further, the counter balancer can generate the require torque for driving links and additional torque, and thus, the load capacity is maximized and working performance is increased in real working field. Further, the counter balancer is in a module form, and thus is easy to maintain.

Since the gravitational torque generated by the weight of links is compensated, it is possible to maintain the position and posture of the counterbalancing linkage mechanism.

DETAILED DESCRIPTION OF THE EMBODIMENTS

Hereinafter, a counterbalancing linkage mechanism according to an exemplary embodiment in the present disclosure will be described in detail with reference to accompanying drawings.

A counterbalancing linkage mechanism of the present disclosure may be realized as a robot arm. However, the scope of the present disclosure is not limited thereto, and it may be realized in various ways. The counterbalancing linkage mechanism according to the present disclosure will be described as a robot arm having a plurality of links that are continuously connected.

The counterbalancing linkage unit according to the present disclosure has a structure in which a plurality of links and joints are continuously connected. When the counterbalancing linkage mechanism maintains a particular position in a space, a required gravitational torque needs be generated by a motor and a reducer mounted at each joint. If the position of the counterbalancing linkage mechanism is changed, the gravitational torque by its own weight changes. Therefore, the required torque generated by the motor and the reducer for compensating the gravitational torque also changes.

Conventionally, an encoder, which is mounted at each joint, measures a rotational angle of each link. A gravitational torque is calculated by the measured rotational angle of each link, and a gravitational torque corresponding to a required torque is generated by a motor.

According to the present disclosure, the counterbalancing linkage mechanism can automatically compensate a gravitational torque by using a gravitational force compensation apparatus (for example, a counter balancer) with respect to every position of the counterbalancing linkage mechanism without any additional sensor, controller, or motor. Therefore, the required torque generated by the motor and the reducer becomes zero during the operation of the robot.

Further, since the gravitational force compensation apparatus may be in a module form, it is easy to maintain.

Figure 1:
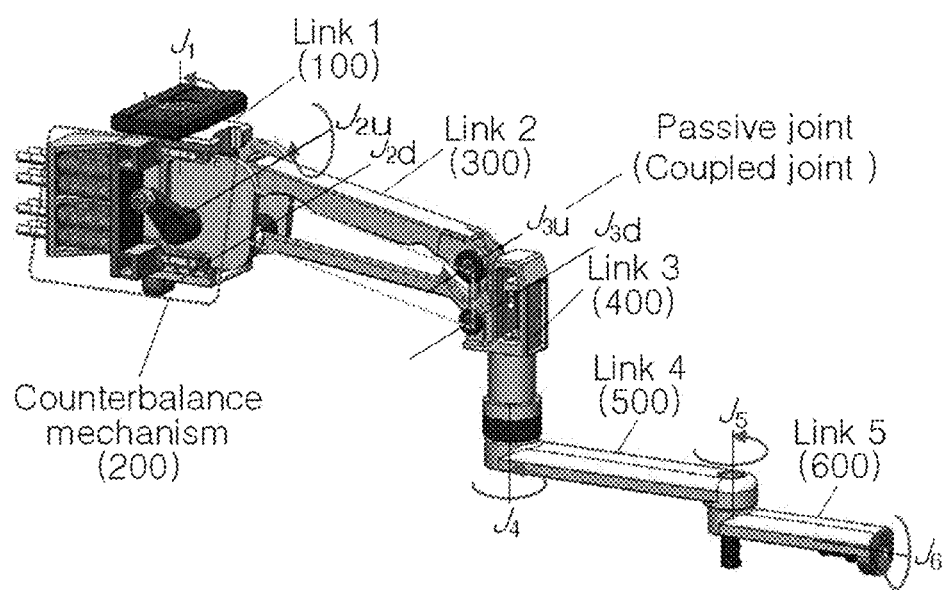
FIG. 1 is a perspective view illustrating a counterbalancing linkage mechanism according to an exemplary embodiment in the present disclosure.

Referring to FIG. 1, a counterbalancing linkage mechanism according to an exemplary embodiment in the present disclosure includes a base link 100 as a first link including a first joint J1, a counter balancer 10, a second link 300, and a third link 400.

The base link 100 as the first link is connected to the second link 300 and may rotate based on the first joint J1. A position of the base link 100 may be fixed.

An end effector (not shown), such as a roll motor or a gripper, may be disposed at an end portion of the third link 400. A fourth link 500 and a fifth link 600 may be disposed at an end portion of the third link 400.

Hereinafter, the counterbalancing linkage mechanism including the fourth and the fifth links 500, 600 will be described in detail.

Figure 2:
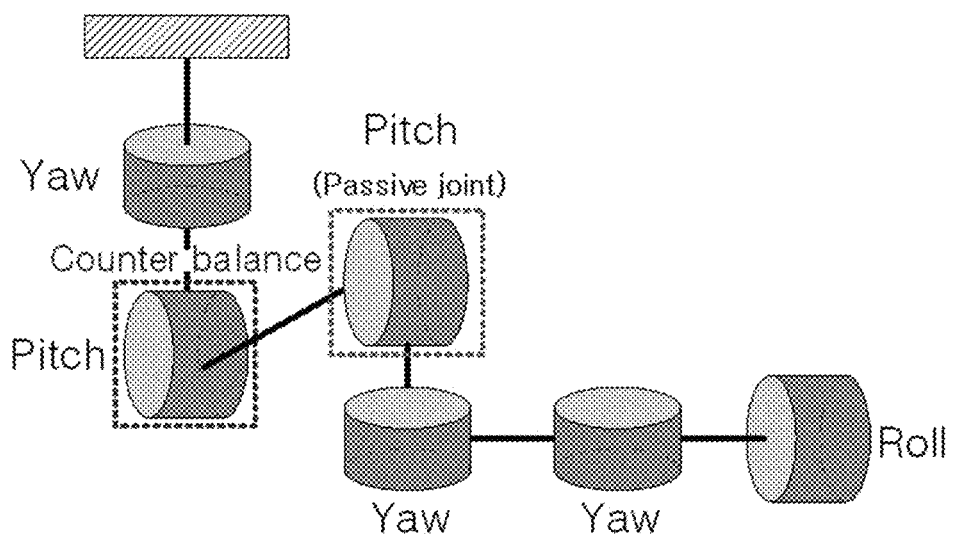
FIG. 2 is a schematic diagram illustrating a counterbalancing linkage mechanism according to an exemplary embodiment in the present disclosure.

Referring to FIGS. 1 and 2, the counterbalancing linkage mechanism may have five degree of freedom (DOF), but the scope of the present disclosure is not limited thereto. For example, the counterbalancing linkage mechanism may include five joints performing yaw motion (active joint)—pitch motion (active joint)—pitch motion (passive joint)—yaw motion (active joint)—yaw motion (active joint)—roll motion (active joint). That is, the counterbalancing linkage mechanism may have five active joints and one passive joint.

The counterbalancing linkage mechanism may comprise a four-bar linkage including the second link 300, the third link 400, the base link 100 in which third joints J3u and J3d are formed as passive joints in conjunction with second joints J2u, J2d, such that the fourth link 500, and the fifth link 600 which is always parallel with the ground. Therefore, the robot operation becomes easy in real working field.

Further, the counterbalancing linkage mechanism according to the present disclosure can support a load through the counter balancer 10, in which a cross roller bearing is inserted in the first joint J1 and a fourth joint J4 to support a moment applied in the first joint J1 and the fourth joint J4.

The position of the base link 100 may be fixed or movable. In the present disclosure, the base link 100 capable of rotating on the first joint J1 is exemplarily described.

One end of the second link 300 is rotatably connected to the base link 100 such that the second joints J2u, J2d are formed, and a center of mass of the second link 300 is spaced apart from the second joints J2u, J2d at a predetermined distance. The third link 400 is connected to the other end of the second link 300.

Figure 3:
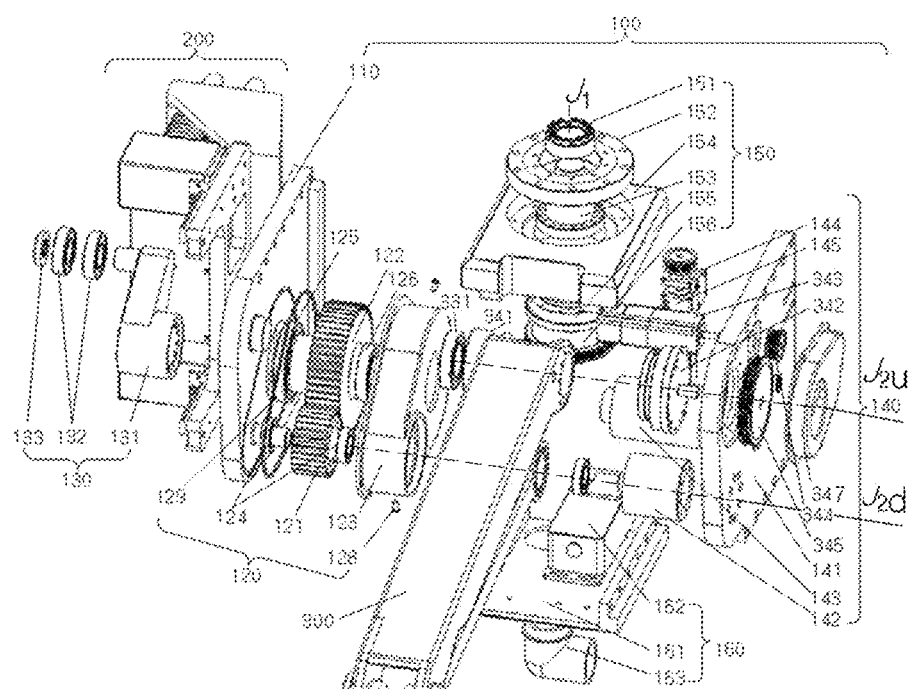
FIGS. 3 to 5B are partial exploded perspective views illustrating a counterbalancing linkage mechanism according to an exemplary embodiment in the present disclosure.

Referring to FIG. 3, the base link 100 may form a frame structure. The base link 100 includes a left base frame 110, a right base frame 140, an upper base frame 150, and a lower base frame 160. The counter balancer 10 is disposed at the left base frame 110.

The right base frame 140 and the left base frame 110 are spaced apart from each other while facing each other.

An upper base 154 of the upper base frame 150 is disposed at an upper portion of the left base frame 110, and a lower base 161 of the lower base frame 160 is disposed at a lower portion of the left base frame 110. Additional constituent elements (e.g., counter balancer) are disposed in an internal space formed by the left base frame 110, the upper base 154, the lower base 161, and a right base 141.

In detail, the right base frame 140 includes a right base 141, a base first connector 143, and a base second connector 142.

The base first connector 143 is connected to a delivery gear portion 120 of a counter balancer, that is, the base first connector 143 is connected to a delivery upper ball bearing 126 and a delivery upper gear 122.

Figure 5A:
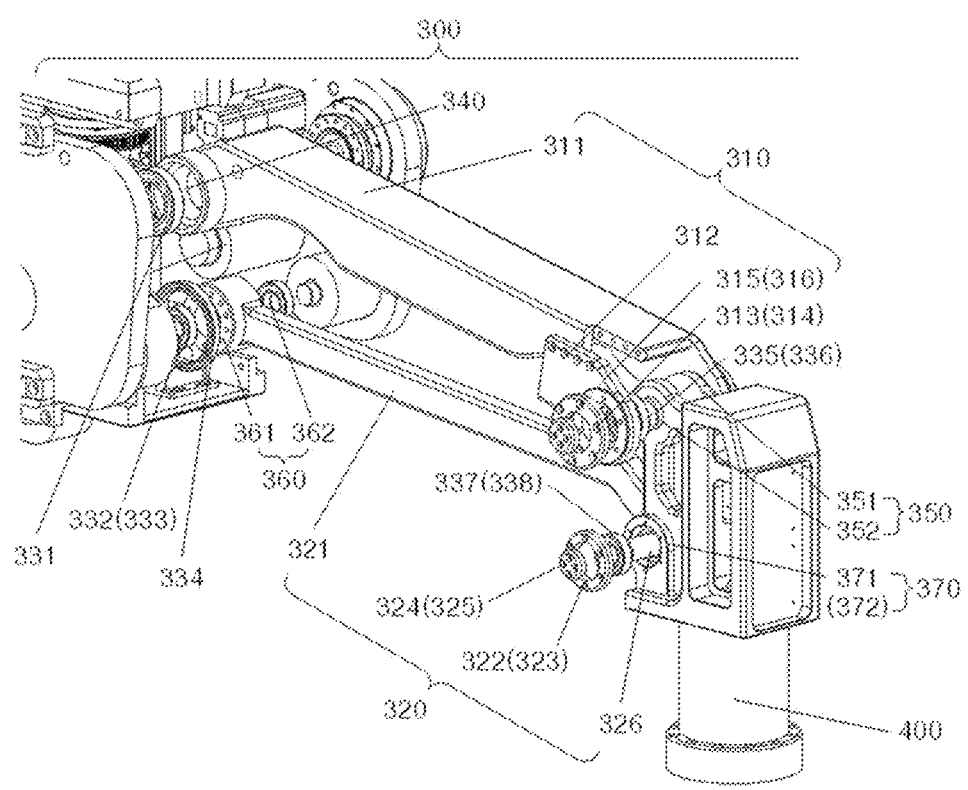

The base second connector 142 is connected to a delivery lower ball bearing 124 and a deliver lower gear 121 of the delivery gear portion 120 through a second lower joint portion 360 of the second link 300 (refer to FIG. 5A).

A base driver as a first driver is disposed at the right base 141, and the base driver generates a driving torque for rotating the base link 100 with respect to the first joint J1. The base driver includes a first driving frame 144 and a first driving motor 145 disposed at the first driving frame 144. The base driver may be fixedly mounted at the right base 141 of the right base frame 140. The first driving motor 145 may be connected to an upper base pulley 156 of the upper base frame 150 through a connecting means (e.g. pulley belt).

Referring to FIG. 5A, a second upper joint portion 340 and a second lower joint portion 360 are connected to the right base 141 so that a second upper link 310 and a second lower link 320 may rotate. A second driver 346 is mounted at the right base 141 and generates a driving torque. The second upper link 310 an the second lower link 320 are rotated by the driving torque.

The second driver 346 includes a second reducer 342, a second driving motor 343, a second driving pulley 344, and a second delivery pulley 345. The second driving motor 343 is fixedly mounted at the right base 141, and the second driving pulley 344 is connected to a shaft of the second driving motor 343. The second driving pulley 344 is rotatably connected to the second delivery pulley 345 through a belt (not shown), The second delivery pulley 345 transmits the driving torque to the second upper joint portion 340 of the second link 300 through the second reducer 342 which is disposed in the right base 141. The second driving pulley 344 and the second delivery pulley 345 are protected from foreign materials by a second driving cover 347 which is mounted at an exterior side of the right base 141.

The upper base pulley 156 may be connected to additional structure (not shown) which is connected to an upper base connector 153 through an upper base reducer 155. The upper base connector 153 is mounted at the upper base 154 through an upper cross roller bearing 152. An end portion of the upper base connector 153 minimizes an influence of a moment load by weight of links through an upper mechanical lock 151.

The lower base frame 160 includes a lower base 161 which connects the left base frame 110 and the right base frame 140, A power supply unit 162 is dispose at one side of the lower base 161 and is connected to an outer electric apparatus (not shown) through a cable connector 163. The power supply unit 182 may receive a control signal through the cable connector 163.

The counter balancer 10 for compensating a gravitational force is disposed at the left base frame 110. One end of the counter balancer 10 is connected to the second joints J2u, J2d and another end of the counter balancer 10 is fixedly mounted at the base link 100 such that the counter balancer 10 compensates the load by the gravitational force of the second link 300 when the second link 300 rotates on the second joints J2u, J2d.

The counter balancer 10 includes a counter balancer delivery portion 12 and a counter balancer driving portion 200. The counter balancer delivery portion 12 includes a delivery gear portion 120 and a delivery crank portion 130.

The delivery gear portion 120 and the delivery crank portion 130 are connected to the second link 300, and rotate together with the second link 300 when the second link 300 rotates.

The counter balancer driving portion 200 linearly moves by contacting the delivery crank portion 130. The counter balancer driving portion 200 compensates a torque generated due to a weight of the second link 300 and a load capacity due to an interaction with the counter balancer delivery portion 12.

That is, the delivery gear portion 120 is connected to the second lower joint portion 360 and moves together with the second lower link 320. The delivery gear portion 120 is connected to the delivery crank portion 130.

One end of the counter balancer delivery portion 12 is connected to the second lower link 320 and the second lower joint portion 360, and another end of the counter balancer delivery portion 12 is connected to the counter balancer driving portion 200. The counter balancer delivery portion 12 includes a delivery gear portion 120 and a delivery crank portion 130. One end of the delivery gear portion 120 moves together with the second link 300, and another end of the delivery gear portion 120 is connected to the delivery crank portion 130.

The delivery gear portion 120 includes a delivery upper gear 122 and a deliver lower gear 121. The delivery upper gear 122 and the deliver lower gear 121 are engaged with each other. The deliver lower gear 121 is connected to the second lower link 320. In detail, the deliver lower gear 121 is coaxially rotatably connected to the second lower joint portion 360 through the delivery lower ball bearing 124 between the left base frame 110 and the second lower link 320.

The delivery upper gear 122 is coaxially connected to the delivery crank portion 130. In detail, the delivery upper gear 122 is disposed between the left base frame 110 and the second upper link 310 through the delivery upper ball bearing 126. The delivery upper gear 122 and the deliver lower gear 121 are gear-engaged. The delivery upper gear 122 and the deliver lower gear 121 are disposed at the left base frame 110 such that constituent elements are not interfered with the delivery upper gear 122 and the deliver lower gear 121 by a delivery gear portion cover 123. A cover sealer 129 is disposed between the delivery gear portion cover 123 and the left base frame 110 such that it is possible to prevent foreign materials from flowing into.

The delivery upper gear 122 engaged with the deliver lower gear 121 is connected to the delivery crank portion 130 which is disposed outside of the left base frame 110.

The delivery crank portion 130 includes a delivery crank 131 and a delivery roller 132.

One end of the delivery crank 131 is connected to the delivery upper gear 122 of the delivery gear portion 120 and rotates together. The delivery roller 132 is freely rotatably connected to another end of the delivery crank 131. The delivery roller 132 is in contact with the counter balancer driving portion 200.

The delivery roller 132 is spaced apart from a center of the delivery crank 131 at a predetermined distance. A bearing cap 133 may be disposed at the delivery roller 132 for smooth rotation.

Figure 4:
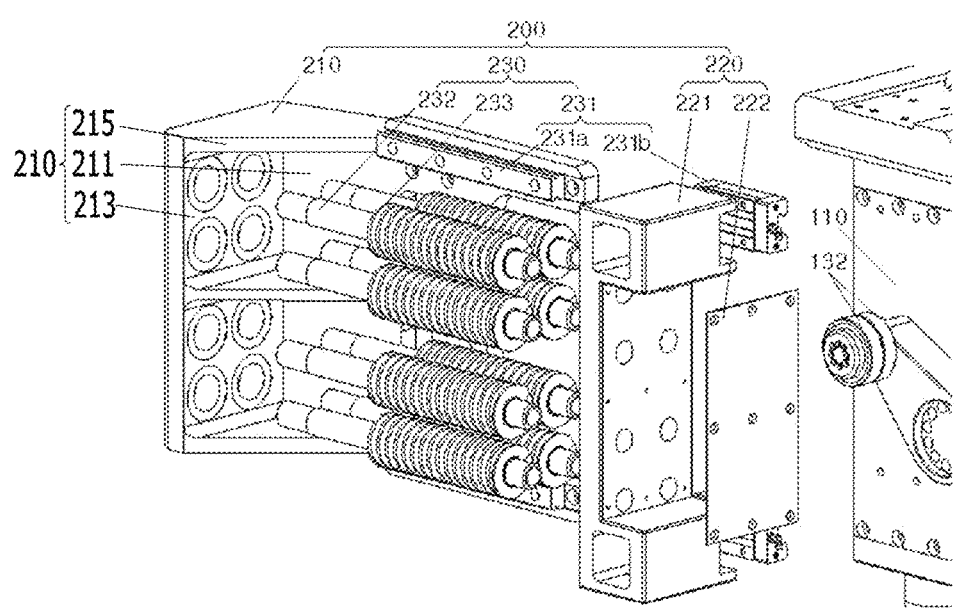

Referring to FIG. 4, the counter balancer driving portion 200 includes a moving base frame 210, a moving block 220, and a moving elastic portion 230.

The moving base frame 210 is fixedly mounted at the base link 100. The moving block 220 is disposed on the moving base frame 210 and linearly reciprocates. The moving elastic portion 230 elastically support the moving block 220 toward the delivery crank portion 130.

The moving base frame 210 includes a driving base portion 211 parallel with the left base frame 110, a driving vertical portion 213 vertical to the driving base portion 211, and a driving rib portion 215 disposed between the driving base portion 211 and the driving vertical portion 213.

The moving block 220 relatively moves with respect to the moving base frame 210. The moving block 220 is elastically supported toward the delivery crank portion 130 by the moving elastic portion 230. A moving motion structure 231 is provided in the moving block 220 for smooth motion of the moving block 220. Detailed description about moving motion structure 231 will be described later.

The moving elastic portion 230 includes a moving elastic shaft 232 and a moving elastic member 233.

One end of the moving elastic shaft 232 penetrates the moving base frame 210 and another end of the moving elastic shaft 232 is fixedly mounted at the moving block 220, such that the moving elastic shaft 232 moves as the moving block 220 moves. The moving elastic member 233 covers an external circumference of the moving elastic shaft 232 and is disposed between the moving base frame 210 and the moving block 220. The moving elastic member 233 may be compressed as the moving block 220 moves toward the moving base frame 210.

The moving block 220 includes a moving block body 221 and a moving block plate 222. The moving block body 221 is connected to the moving elastic shaft 232, and the moving block plate 222 is disposed at the moving block body 221. The moving block plate 222 and the delivery roller 132 are contacted with each other. The counter balancer driving portion 200 is separable from the left base frame 110 so maintenance is easy.

The counter balancer driving portion 200 further includes the moving motion structure 231, and the moving motion structure 231 includes a moving motion block 231a and a moving motion rail 231b.

The moving motion block 231a is disposed at the moving block 220 and moves together with the moving block 220.

The moving motion rail 231b is disposed at a position corresponding to the moving motion block 231a of the moving block body 221 and engaged with the moving motion rail 231b, such that the moving block body 221 relatively moves with respect to the moving motion rail 231b.

Therefore, when the position of the second link 300 changes, a power or torque transmitted from the delivery crank 131 and the delivery roller 132 is transmitted to the moving motion structure 231 through the moving block 220. The power or torque transmitted the moving motion structure 231 compresses the moving elastic portion 230, and the elastic restoring force generated by the moving elastic portion 230 is transmitted to the second link 300 and operates as a compensation torque. Since the compensation torque compensates a torque by a change of weight of the second link 300, the position of the second link 300 exactly may be maintained without additional driving torque.

The second link 300, which may be realized as a simple linkage, includes the second upper link 310 and the second lower link 320. The second upper link 310 and the second lower link 320 are connected the base link 100 and the third link 400, respectively, such that a four-bar linkage is formed.

That is, the second link 300 includes the second upper link 310 and the second lower link 320. The second upper link 310 and the second lower link 320 are spaced apart with each other. One end of each of the second upper link 310 and the second lower link 320 is connected to the base link 100, and another end of each of the second upper link 310 and the second lower link 320 is connected to the third link 400, respectively. A second upper joint portion 340, a third upper joint portion 350, a second lower joint portion 360, and a third lower joint portion 370 are disposed at each connecting portion.

The joints 340, 350, 360, and 370 form second joints J2u and J2d and third joints J3u and J3d together with adjacent links.

That is, the second upper link 310 is rotatably connected to the base link 100 through the second upper joint portion 340.

The second reducer 342 of the second driver 346 is connected to the second upper joint portion 340. The second upper joint J2u is formed in which the second upper link 310 rotates through the second upper joint portion 340 with respect to the base link 100.

The second lower joint portion 360 is disposed at an end portion of the second lower link 320, and the second lower link 320 is rotatably connected to the base link 100 through the second lower joint portion 360. The second lower joint portion 360 includes a second lower right joint 361 and a second lower left joint 362 such as a bearing connected to the base second connector 142 such that a second lower joint J2d is formed in which the second lower link 320 rotates with respect to the base link 100.

The second upper link 310 is rotatably connected to the third link 400 through the third upper joint portion 350.

The third upper joint portion 350 includes a third upper right joint 351 and a third upper left joint 352 disposed at the third link 400. The second upper link 310 includes a second upper link body 311 and a second upper left delivery link 312 disposed at an end portion of the third link 400. The third upper right joint 351 and the third upper left joint 352 are disposed at an end portion of the second upper link 310.

Angular contact bearings 335 and 336 for smooth rotation are disposed between the second upper left delivery link 312 and the third upper right joint 351, and between the second upper left delivery link 312 and the third upper left joint 352, respectively.

Second upper joint inner caps 315 and 316 and second upper joint outer caps 313 and 314 for preventing the angular contact bearings 335 and 336 from being separated may be disposed at exterior sides of the angular contact bearings 335 and 336.

The second lower link 320 is rotatably connected to the third link 400 through the third lower joint portion 370.

Figure 5B:
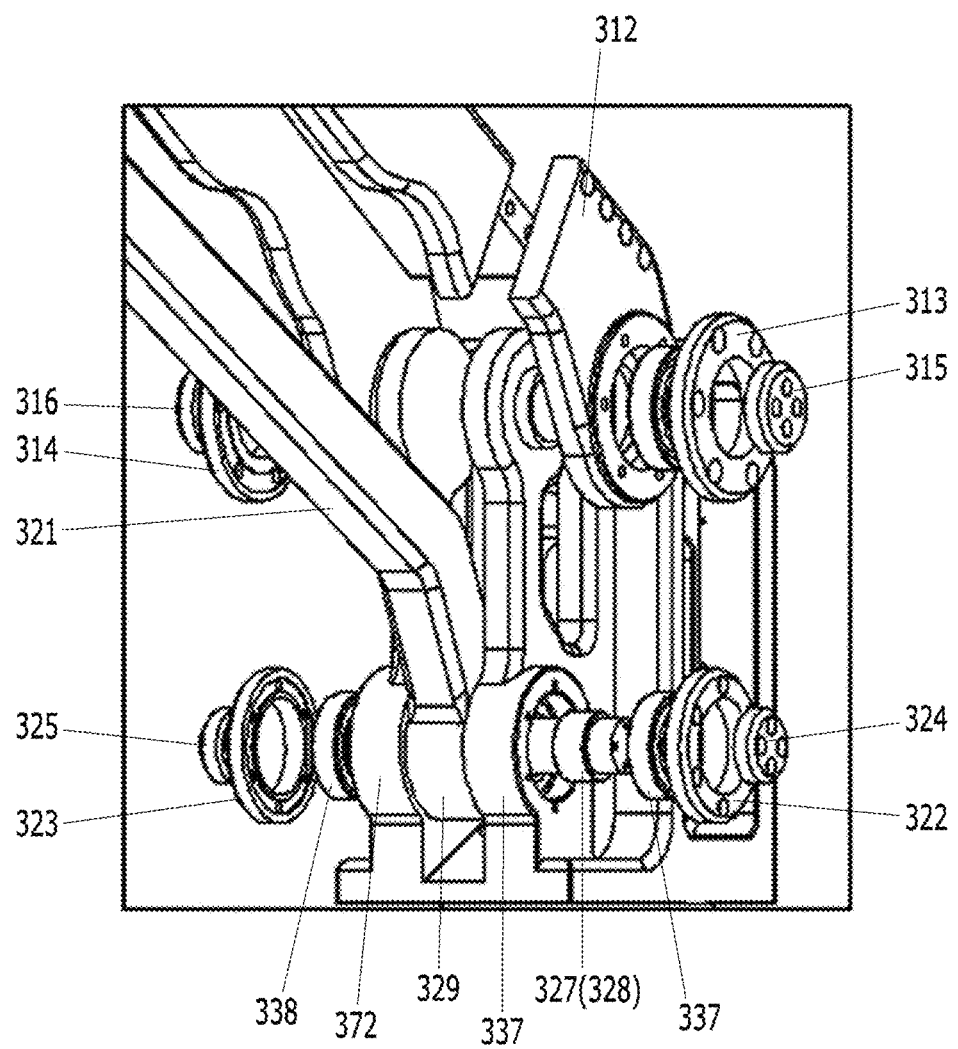

The third lower joint portion 370 includes a third lower right joint 371 and a third lower left joint 372 disposed at the third link 400. The second lower link 320 includes a second lower link body 321 and a second lower delivery body 329 disposed at the end portion of the third link 400 as a connector (refer to FIG. 5B).

The third lower right joint 371 and the third lower left joint 372 are formed at the end portion of the second lower link 320. A second lower link shaft 326 penetrates the third lower right joint 371 and the third lower left joint 372. Bearing spacers 327 and 328 are disposed at an outer side of the second lower link shaft 326. Deep groove ball bearings 337 and 338 for smooth rotation of the second link 300 are disposed at both sides of the second lower link shaft 326. Second lower joint inner caps 324 and 325 and second lower joint outer caps 322 and 323 are disposed at both sides of the deep groove ball bearings 337 and 338. The same structure of the second lower link shaft 326 may be applied to the third upper joint portion 360.

The second link may be curved or bent in order to obtain a greater working radius.

Figure 6A:
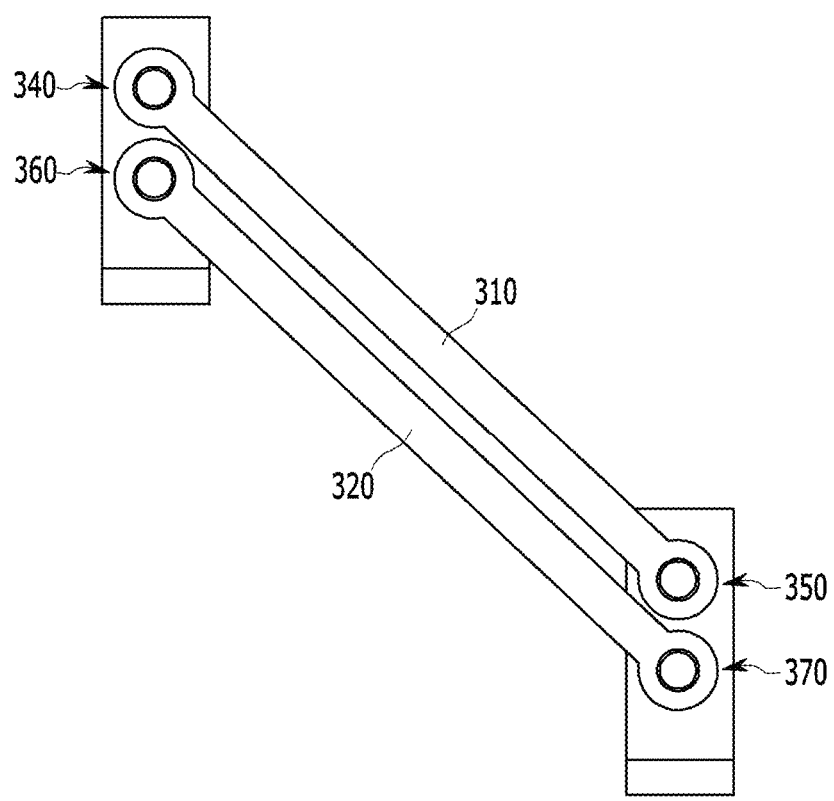
FIGS. 6A to 7B show operations of a base link, a second link, and a third link.
Figure 6B:
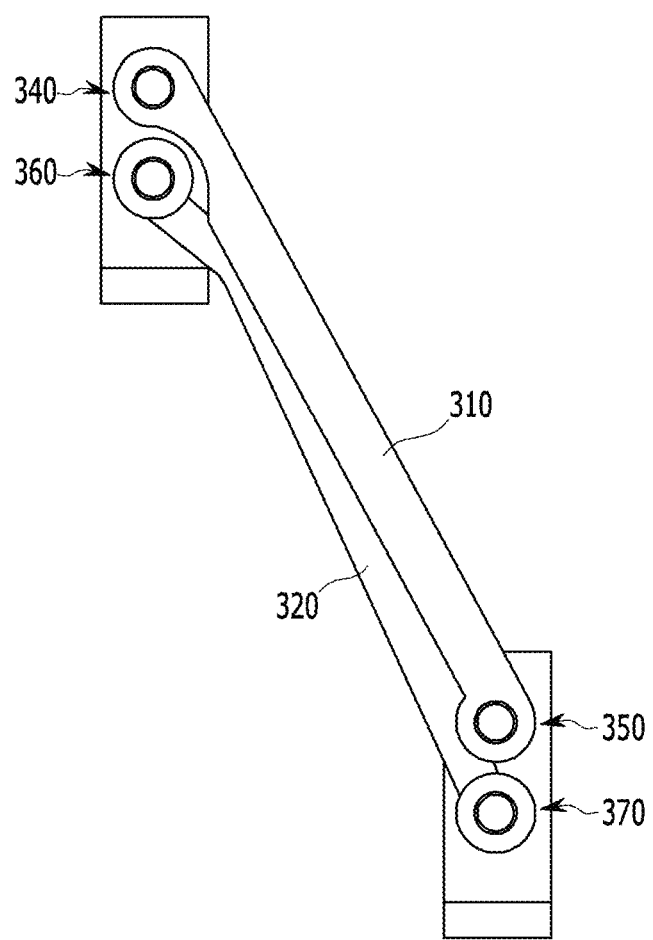
Figure 7A:
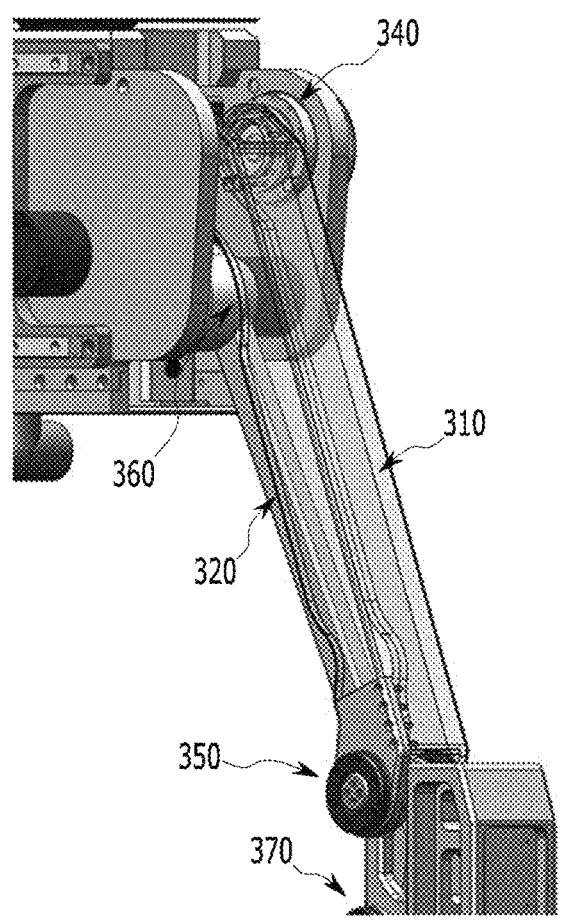
Figure 7B:
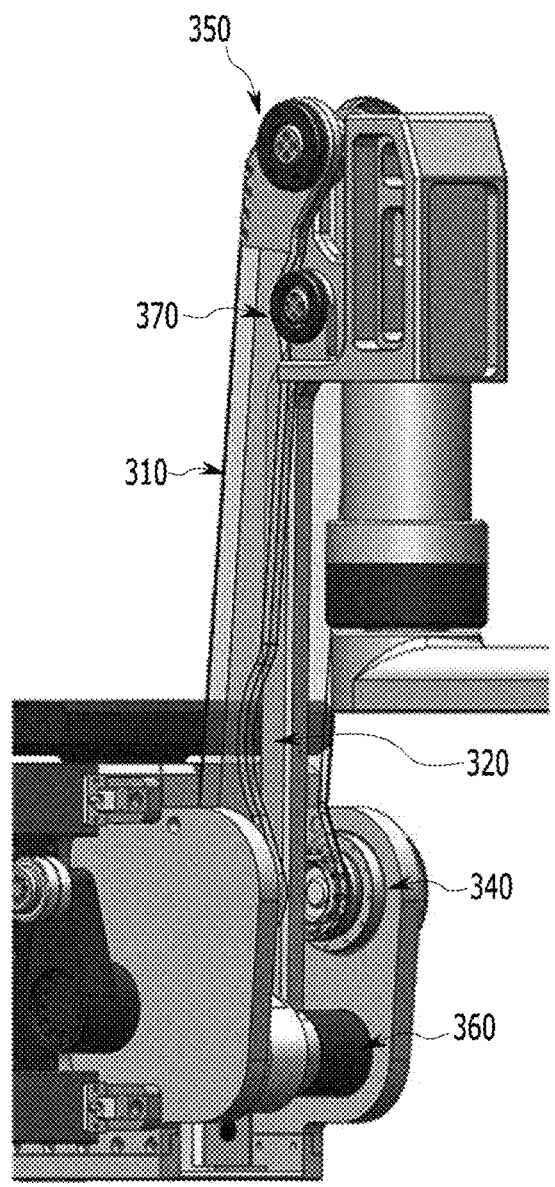

FIG. 6A shows that the second link is a simple straight link, and FIG. 6B shows that the second link is curved or bent. Referring to FIG. 6B, the second lower link body 321 is bent, and a second upper groove 319 is formed at the second upper link body 311. Thus, the second lower link body 321 and the second upper link body 311 are not interfered when the second lower link body 321 and the second upper link body 311 rotate. Therefore, the structure of FIG. 6B has a wider rotational angle comparing to the structure of FIG. 6A.

As described above, since the counterbalancing linkage mechanism is formed by four-bar linkage comprising the base link, the third link, and the second link, in which the third joints are passive joints rotating together with the second joints, and the fourth link and the fifth link are operated in parallel with the ground. Thus, operating the robot becomes easy in real working field.

Figure 8:
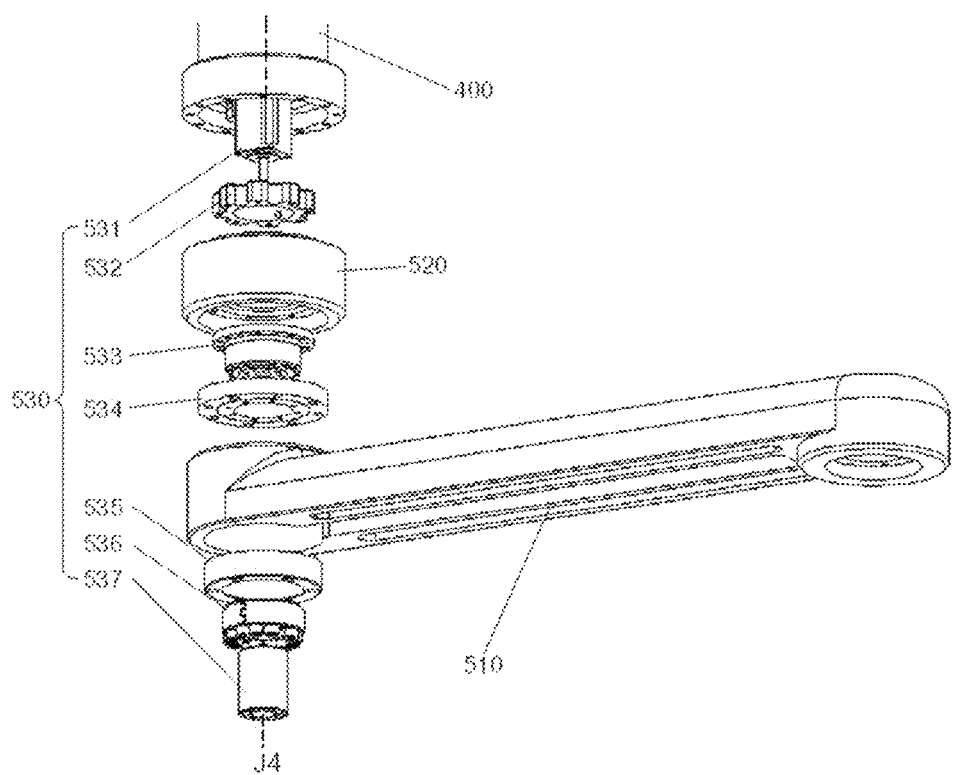
FIGS. 8 and 9 are partial exploded perspective views illustrating a counterbalancing linkage mechanism according to an exemplary embodiment in the present disclosure.

Referring to FIG. 8, the fourth link 500 may be disposed at an end portion of the third link 400. The third joints J3u, J3d are formed by connecting the third link 400 and the fourth link 500, and the fourth link 500 moves on a plane vertical to a length direction of the third link 400.

Figure 9:
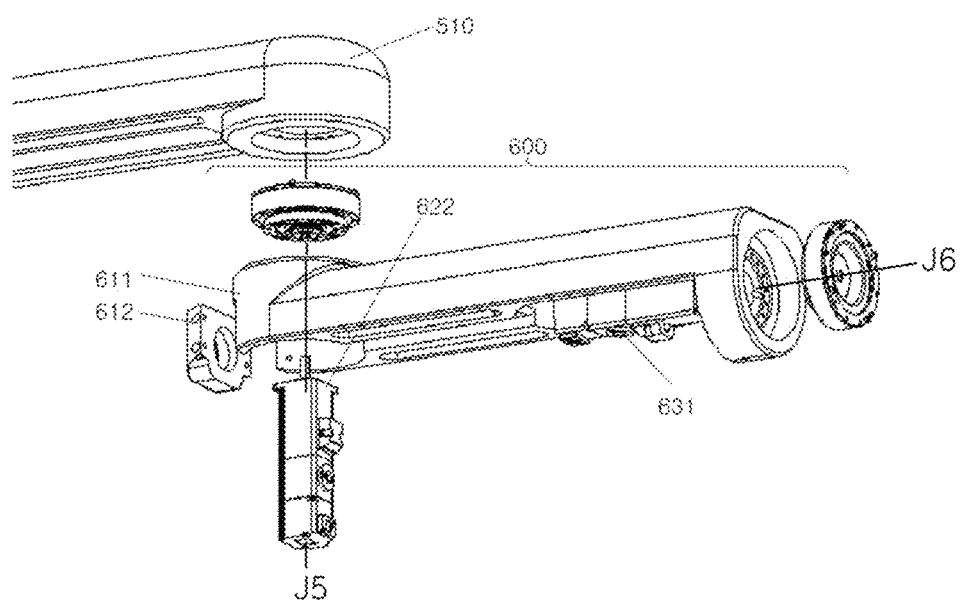

Referring to FIG. 9, the fifth link 600 may be disposed at an end portion of the fourth link 500, the fourth joint J4 is formed by connecting the fourth link 500 and the fifth link 600, and the fifth link 600 moves on a plane in parallel with a length direction of the fourth link 500. A sixth link (not shown) may be disposed at an end portion of the fifth link 600.

Referring to FIG. 8, the fourth link 500 includes the fourth joint J4.

A third driver 531, a third driver frame 532 fixing the third driver 531 to the third link 400 and/or the fourth link 500, a third reducer 533 connected to the third driver 531, and a fourth link cross roller bearing 534 are engaged in a fourth link bearing housing 520 which is connected to the third link 400.

A fourth link joint first connector 537 is fixedly connected to the third reducer 533, and a fourth link joint second connector 535 is fixedly connected to a fourth link body 510.

The fourth link joint first connector 537 and the fourth link joint second connector 535 are connected with each other through a mechanical lock 536 that connects the fourth link joint first connector 537 and the fourth link joint second connector 535 by a surface pressure. The driving torque generated at the third driver 531 is transmitted to the fourth link body 510 through the third reducer 533, the fourth link joint first connector 537, the mechanical lock 536, and the fourth link joint second connector 535. Therefore, the counterbalancing linkage mechanism is robust to a moment load by the fifth link and load capacity.

Further, an internal space is formed in the fourth link body 510 regardless of the stiffness of the fourth link body 510, and cables of the motor and an ultrasonic wave sensor are installed in the internal space.

As shown in FIG. 9, the fifth link 600 includes a fifth joint J5 and a sixth joint J6. A motor and a reducer are connected in series with respect to the fifth joint J5 and the sixth joint J6, respectively.

A fifth link cable connector fixer 612 for installing a cable of a fourth driver 622 and a fifth driver 631 is mounted at a fifth link body 611. A space for installing cables of an ultrasonic wave sensor and a cable of the fourth driver 622 and the fifth driver 631 may be formed in a fifth link body 611.

Since the fourth link 500 and the fifth link 600 are in parallel with the ground, it is possible to realize a work range of 360 degree.

A sixth link (not shown) may be disposed at an end portion of the fifth link body 611 and may rotate on a rotation axis of a length direction of the fifth link 600. The sixth link may be an end effector.

The counterbalancing linkage mechanism according the present disclosure consists of four-bar linkage and horizontal multi-joint by two pitch joints and three yaw joints except the sixth joint J6 as a roll joint.

Particularly, the second link is designed by four-bar linkage such that the second joints act as an active joint by a driving torque of the driver and the third joints act as passive joints rotating together with the second joints.

Since the third link to the fifth link are in parallel with the ground by the four bar linkage when the second joints rotate, the gravitational torque changes by the second joints. That is, it is possible to operate the counterbalancing linkage mechanism by using only on active joint in a state where an direction and a position of an end portion of the counterbalancing linkage mechanism is constantly maintained with respect to the ground.

Further, when the structure of the four bar linkage is change as shown in FIG. 6B, it is possible to realize wider working range comparing to the structure of the four-bar linkage according to FIG. 6A.

As shown in FIGS. 6A to 7B, a second upper groove 319 is formed in a lower portion of the second upper link 310 such that the second upper link 310 and the second lower link 320 are not interfered with each other, and a rotation radius of the second link's radius increases.

Further, since the second lower link body 321 is bent, the second link 300 and the third link 400 are not interfered with each other when the second link 320 reaches a maximum height and a working range of the counterbalancing linkage mechanism increases.

Hereinafter, the operation of the counterbalancing linkage mechanism will be described in detail.

As described above, the counter balancer includes the counter balancer driving portion 200, the delivery gear portion 120, and the delivery crank portion 130.

A gravitational torque is generated at the second joints according to a position of the third joints J3u and J3d as a passive joint rotating together with the second joints J2u and J2d, and the counter balancer 10 generates a compensation torque toward the opposite direction of the gravitational torque generated at the second joints through the delivery crank 131 of the delivery crank portion 130.

In detail, the position of the third link 400 is determined by the rotation of the second link 300, and the delivery upper gear 122 rotates in the opposite to the rotation direction of the second link 300 when the second link 300 is rotated as the delivery lower gear 121 rotates.

At this time, the delivery crank 131 and the delivery roller 132 connected to the delivery upper gear 122 rotate, and the moving elastic member 233 is compressed by the moving block 220 which is in contact with the delivery roller 132 such that the compensation torque for compensating the gravitational torque according to the rotation of the second link is generated.

Figure 11A:
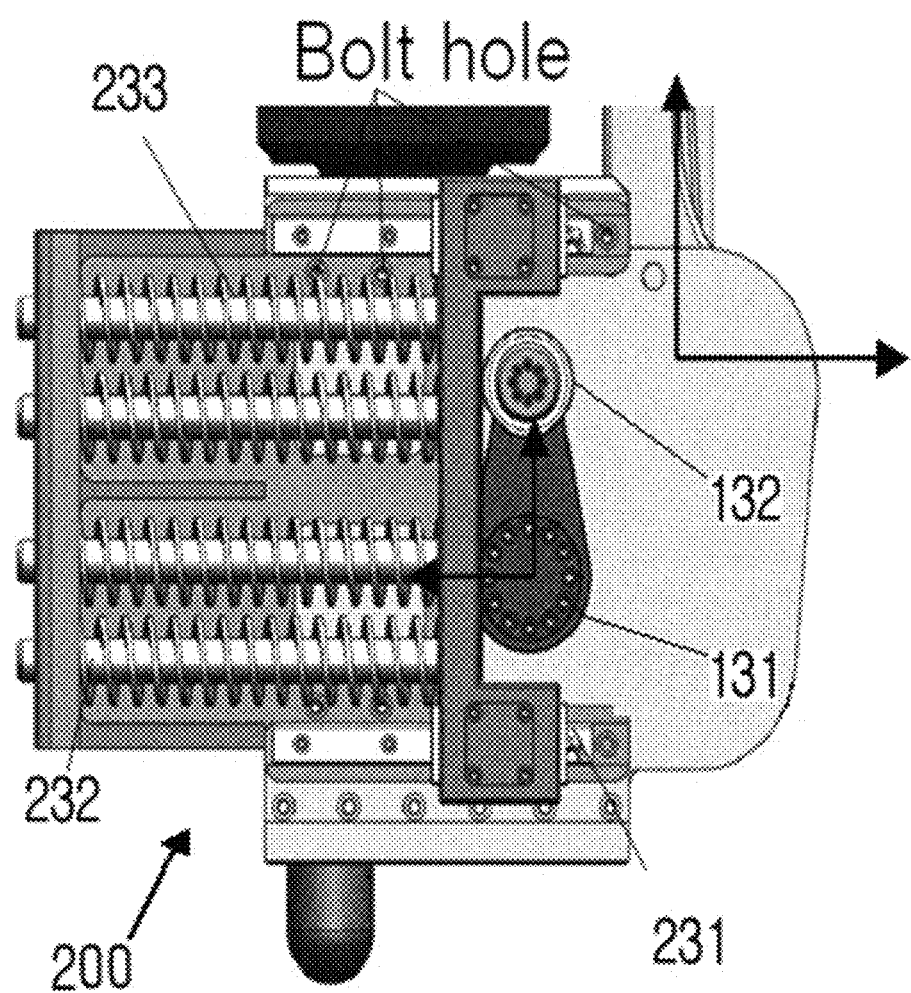

Referring to FIG. 11A, the gravitational torque is zero when the rotational angle of the second link 300 is zero.

Therefore, since the moving elastic member 233 is not compressed, the compensation torque becomes zero.

Figure 11B:
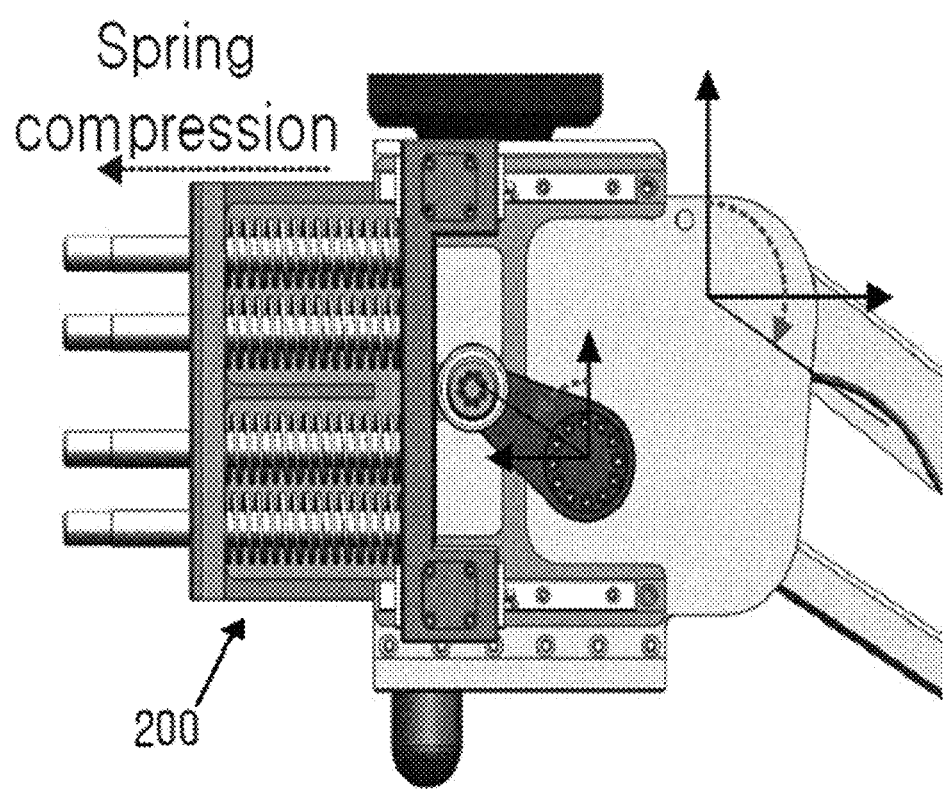

In FIG. 11B, the gravitational torque is generated when the second link 300 rotates. Therefore, the moving elastic member 233 is compressed by the rotation of the delivery crank 131 and the delivery roller 132 connected to the delivery upper gear 122. The compensation torque corresponding to the gravitational torque is generated by multiplying the restoring force of the moving elastic member 233 by a moment arm. The moment arm is a virtual length, and the moment arm may be modeled by the structure of the counterbalancing linkage mechanism.

Figure 10:
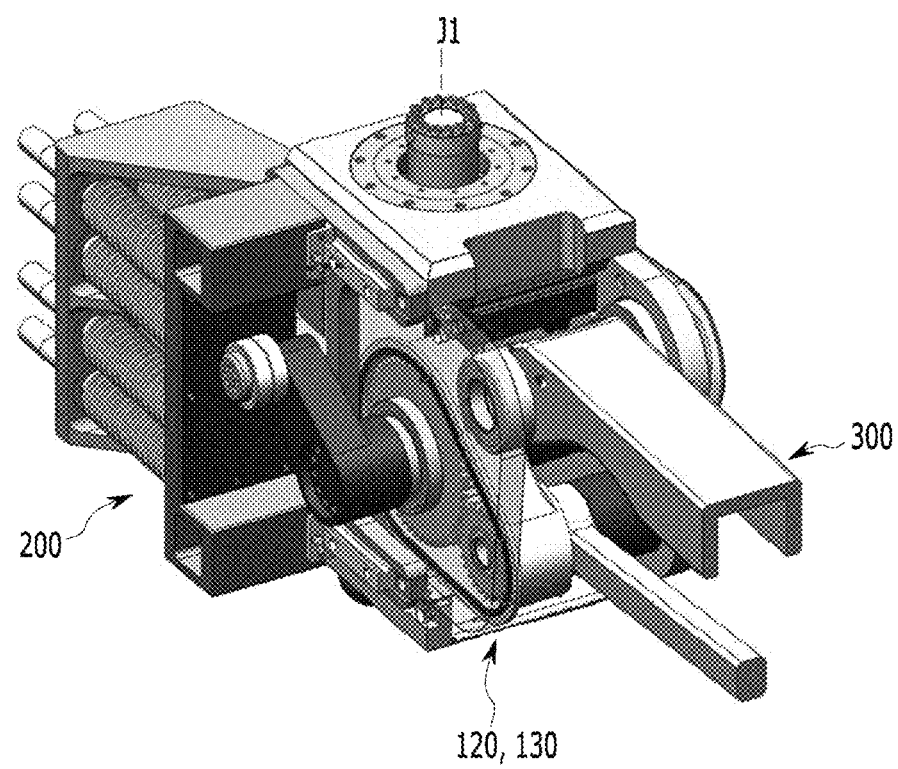
FIGS. 10 to 11B show operations of a counter balancer according to an exemplary embodiment in the present disclosure.

Since the position of the delivery roller 132, a length of the delivery crank 131, a gear ratio between the delivery upper gear 122 and the delivery lower gear 121, and stiffness and the spring coefficient of the moving elastic member 233 are calculated when the counterbalancing linkage mechanism is designed, It is possible to reduce the gravitational torque Referring to FIG. 10, in the counterbalancing linkage mechanism according to the present disclosure, the moving elastic member 233 is realized by compression spring.

Figure 12A:
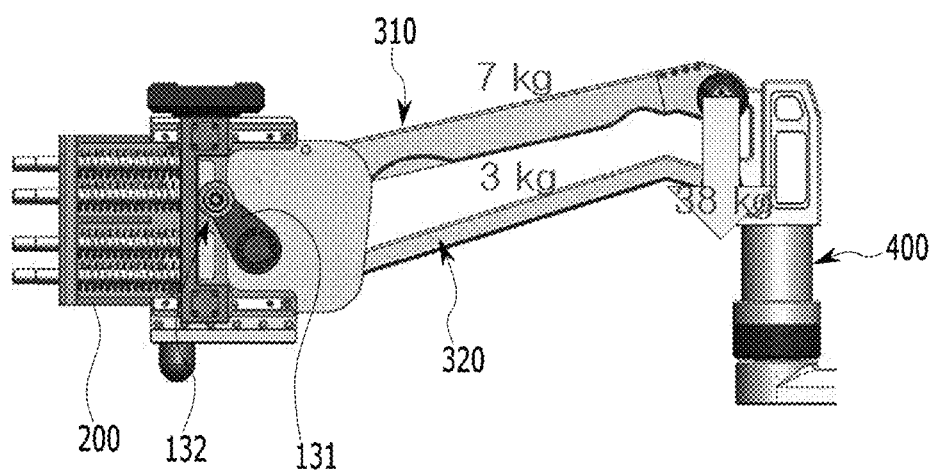
FIGS. 12A and 12B are drawings for explaining a gravitational torque applied to a second link according to an exemplary embodiment in the present disclosure.

As shown in FIG. 12A, the gravitational torque is applied to the second joints, and the gravitational torque is generated by the weight of links (second link, third link, fourth link, and fifth link) and the load capacity of the counterbalancing linkage mechanism.

Figure 12B:
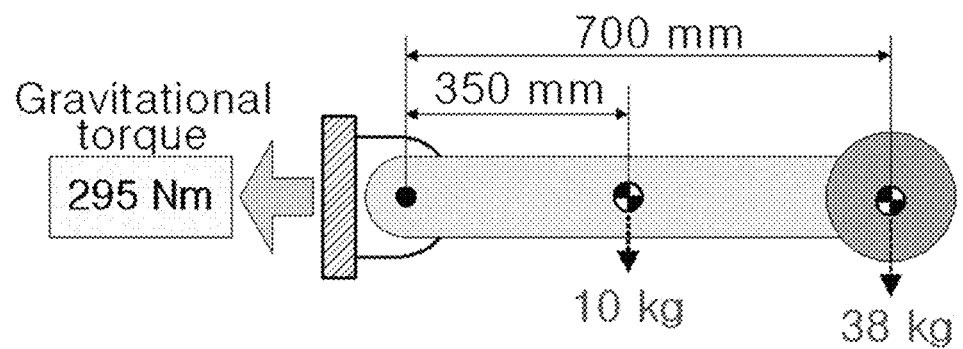
Figure 13:
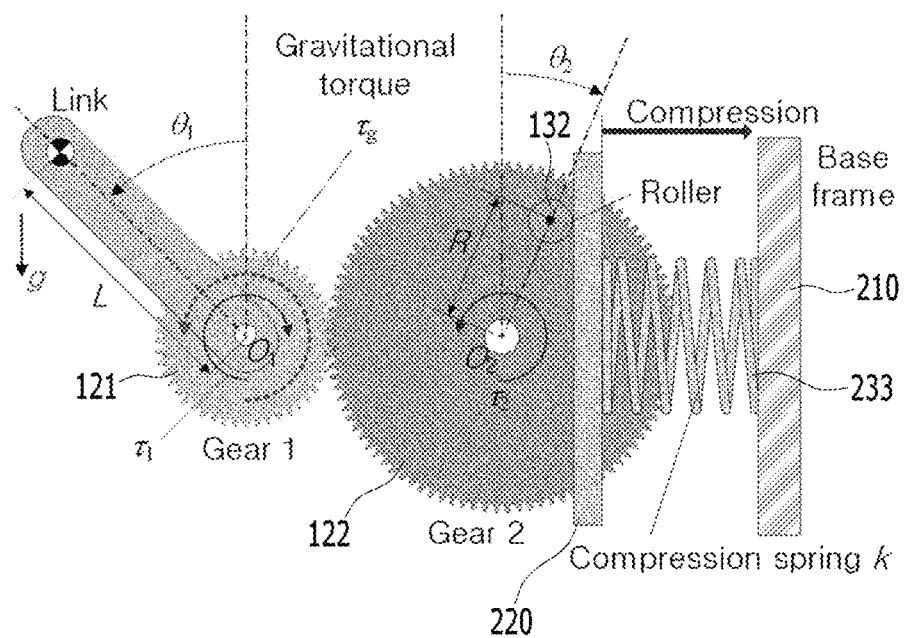
FIGS. 13 and 14A are schematic views for explaining an operation of a counter balancer according to an exemplary embodiment in the present disclosure.
Figure 14A:
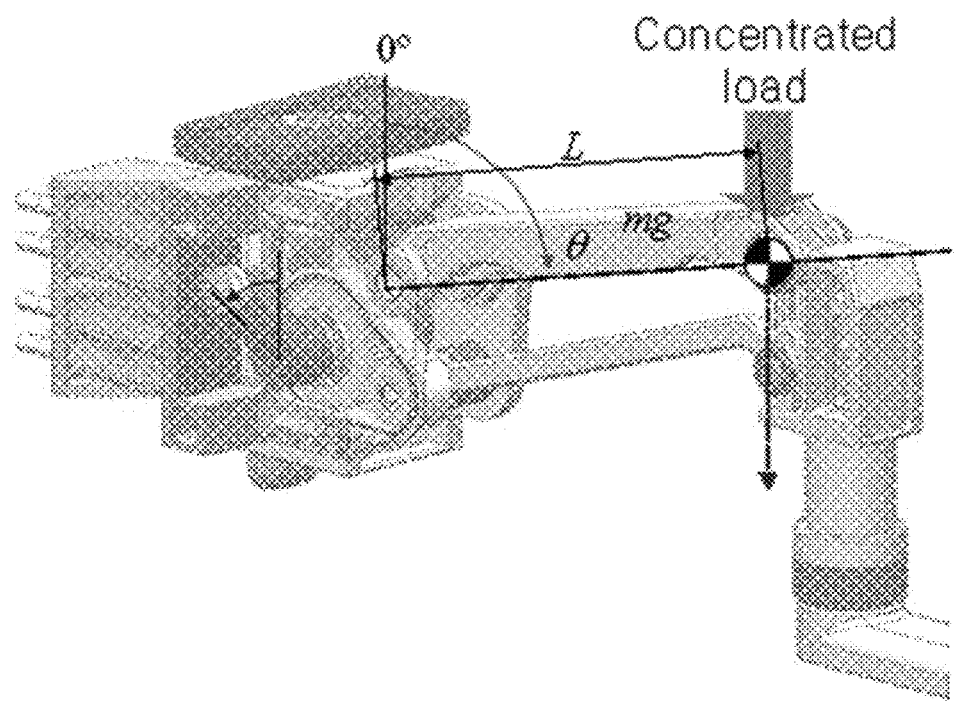

The weight of the third link, the fourth link, the fifth link, and load capacity is applied at the third joints as a concentrated load. Referring to FIGS. 13 and 14A, it is possible to assume the counterbalancing linkage mechanism to one DOF link having mass m and length L. Here, m denotes a mass of the counterbalancing linkage mechanism and L denotes a length from the center of mass of the counterbalancing linkage mechanism to the second joints. Referring to FIGS. 12A to 13, the gravitational torque $t_g$ may be expressed as following equation.

$$\tau_g = mgL \sin \theta_1$$

In order to completely compensate the gravitational torque generated by the weight of the links and the load capacity, the compensation torque t1 should be same with the gravitational torque $t_g$. If we assume that the gear ratio between the delivery upper gear 122 and the deliver lower gear 121 is 1:2, the torque applied to the deliver lower gear 121 from the moving elastic member 233 may be expressed as following equation.

$$\tau_2 = 2\tau_1$$

Further, the delivery roller 132 connected to the delivery upper gear 122 compresses the moving elastic member 233 through the moving block 220 as the delivery upper gear 122 rotates. Here, the length from the center of the delivery upper gear 122 to the center of the delivery roller 132 may denote as R.

The compensation torque t2 may be expressed as following equation. Here, s is compressed distance of the moving elastic member 233, l is length of the moment arm, and Fs is restoring force of the spring, $$\tau_2 = Fsl = FsR\cos\theta_2 = kR^2\sin\theta_2\cos\theta_2 = \frac{kR^2}{2}\sin 2\theta_2$$

As described above, in order to completely compensate the gravitational torque, tg should be same with t1, and the relationship of $\theta_2 = 2\theta_1$ is formed according to the gear ratio.

Therefore, when k and R as a design variable is determined according to the above relationship, it is possible to completely compensate the gravitational torque applied to the second joints.

The overbalancing method considering the weight of the links and additional load is used when the design variable is determined in order to maximize load capacity of the counterbalancing linkage mechanism. Using the above method, the counterbalancing linkage mechanism according to the present disclosure can compensate the gravitational torque generated by the weight of the links and the gravitational torque generated by the load capacity.

In detail, the design variable (k and R) of the compensation torque (t2) is set to be greater than the design variable (k and R) of the gravitational torque (tg). If the torque difference between the t2 and tg exists in the torque range of the motor, the operation of the counterbalancing linkage mechanism is not influenced by the operation of the counter balancer.

Figure 14B:
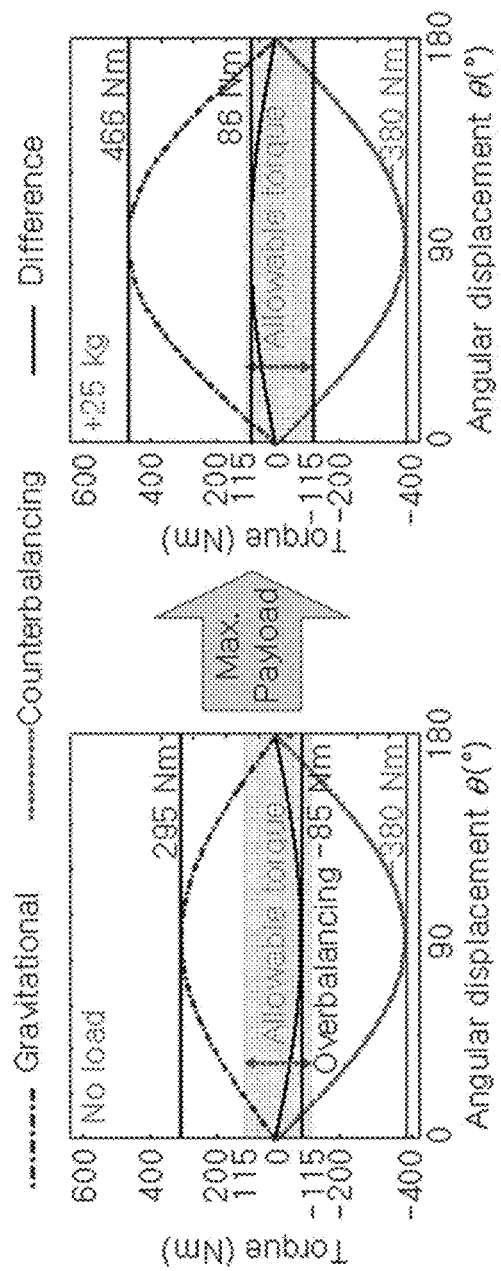
FIG. 14B is a graph for explaining performance of a counter balancer according to an exemplary embodiment in the present disclosure.
Figure 15A:
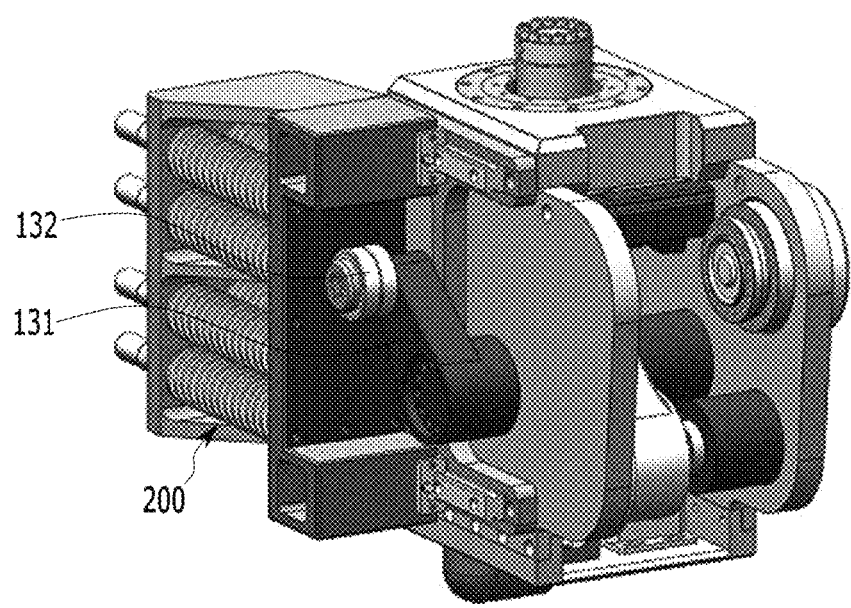
FIGS. 15A and 15B are partial assemble perspective views of a base link according to an exemplary embodiment in the present disclosure.
Figure 15B:
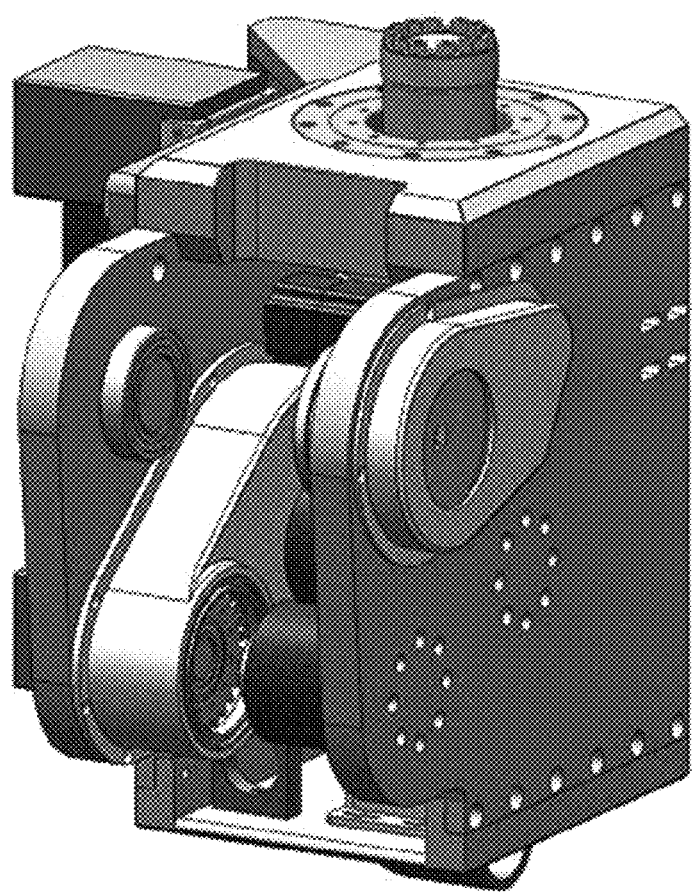
Figure 16A:
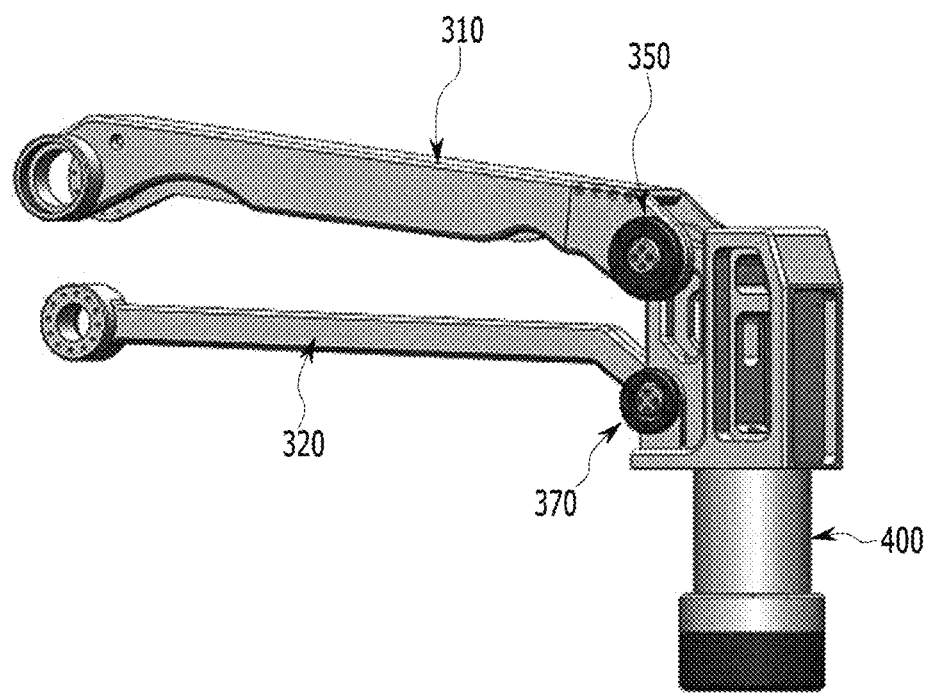
FIGS. 16A and 16B are partial assemble perspective views of a second link and a third link according to an exemplary embodiment in the present disclosure.
Figure 16B:
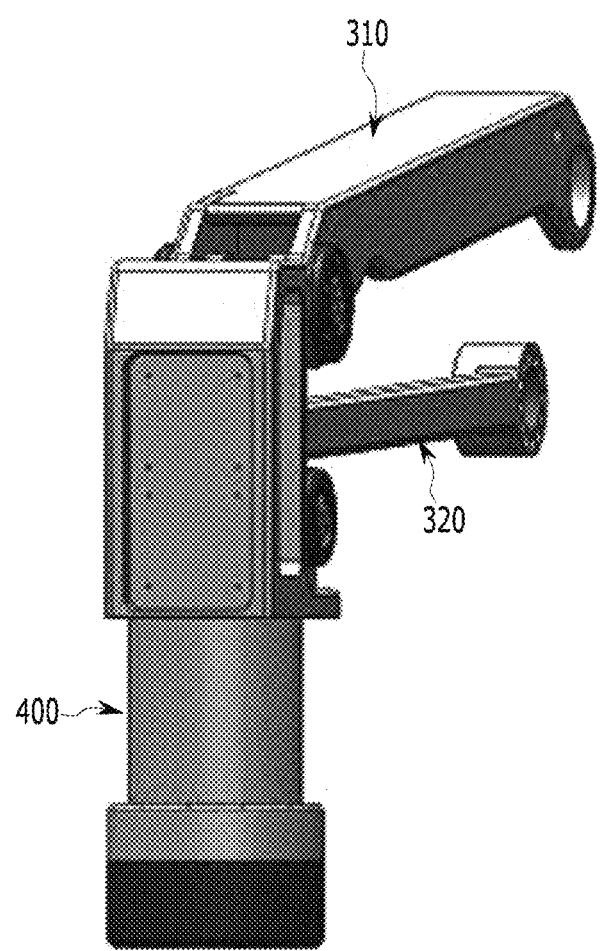
Figure 17A:
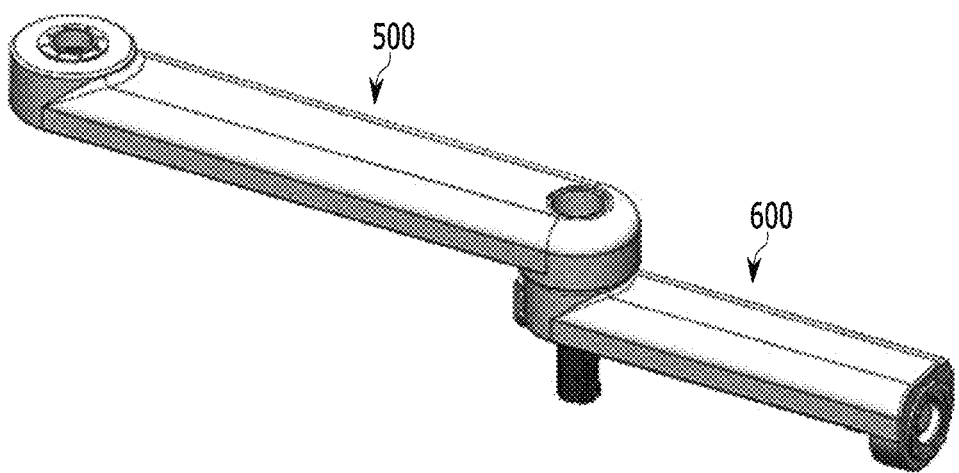
FIGS. 17A and 17B are partial assemble perspective views of a fourth link and fifth link according to an exemplary embodiment in the present disclosure.
Figure 17B:
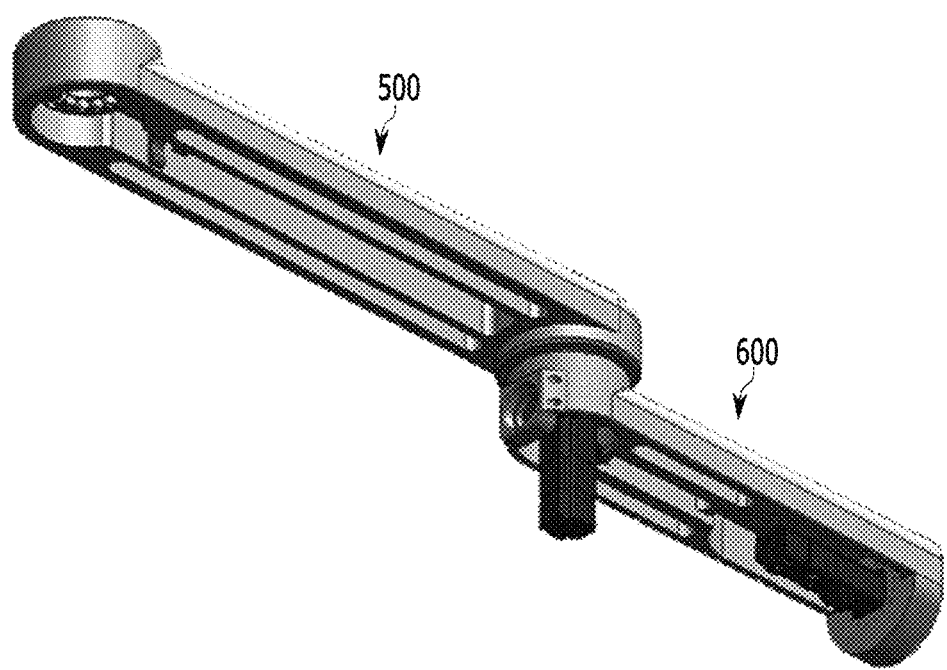
Figure 18:
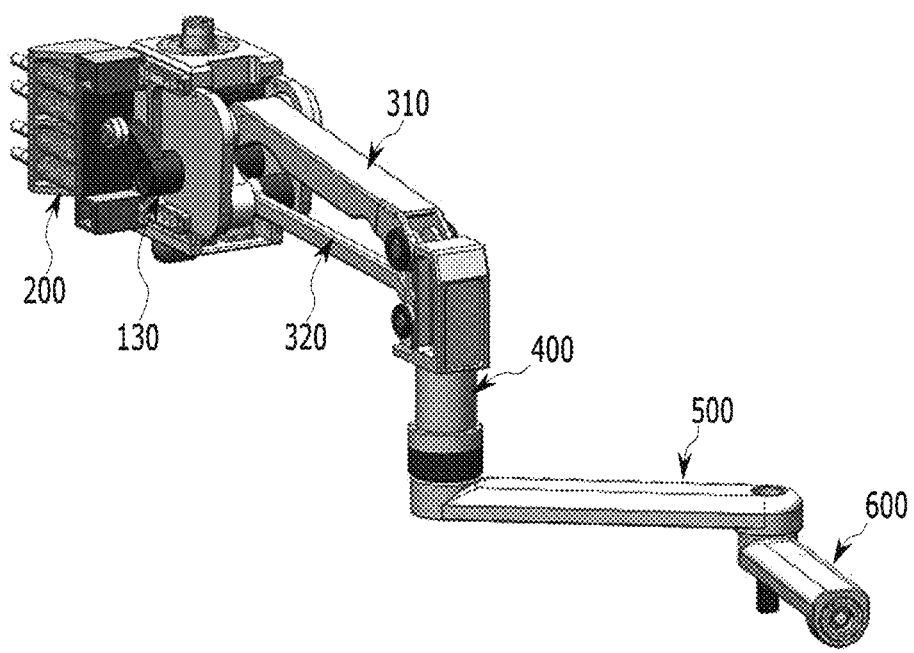
FIG. 18 is a perspective view of a counterbalancing linkage mechanism according to an exemplary embodiment in the present disclosure.

As shown in FIG. 12A to 14A, if mass m is 10 kg, length L s 350 mm, the concentrated load of the end of the link is 38 kg, the spring coefficient is 125,600 N/m, distance R between the center of the delivery upper gear 122 and the center of the delivery roller 132 is 110 mm, then the simulation result can be obtained as shown in FIG. 14B.

In FIG. 14B, the one-point chain line denotes the driving torque of the counterbalancing linkage mechanism, the dotted line denotes the compensation torque, and the solid line denotes overbalance torque. If the load capacity is 25 kg, the maximum required torque for driving the counterbalancing linkage mechanism is 86 Nm. The maximum required torque is 466 Nm when the counter balancer is not mounted. That is, the maximum required torque is noticeably decreased.

According to an exemplary embodiment of the present invention, the counter balancer is in a module form such that it is easy to maintain.

Referring to FIGS. 11A and 11B, assembly and disassembly of the counter balancer driving portion is easily performed by tightening or untightening bolts of the base frame.

The counterbalancing linkage mechanism according to the exemplary embodiment in the present disclosure may be changed in a variety of fashions, such as a robot arm, a delivery apparatus for transferring luggage, an apparatus for supporting a monitor, and so on.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A counterbalancing linkage mechanism comprising:
a base link as a first link including a first joint;
a second link forming a second joint which is rotatably connected to the base link so that a center of mass of the second link is spaced apart from the second joint;
a counter balancer having one portion disposed at the second joint and another portion movably disposed at the base link in a length direction of the second link, the counter balancer compensating a gravitational torque generated due to a weight of the second link when the second link rotates on the second joint; and
a third link connected to the second link,
wherein the counter balancer comprises: a counter balancer delivery portion connected to the second link and rotating by the rotation of the second link; a counter balancer driving portion contacting the counter balancer delivery portion, linearly moving by the rotation of the counter balancer delivery portion, and compensating the gravitational torque generated due to the weight of the second link and a load capacity due to interaction with the counter balancer delivery portion,
wherein the counter balancer delivery portion includes:
a delivery gear portion moving together with the second link; and
a delivery crank portion connected to the delivery gear portion, and
wherein the delivery crank portion includes:
a delivery crank coaxially connected to the delivery gear portion; and
a delivery roller rotatably connected to and contacting the counter balancer driving portion.

2. The counterbalancing linkage mechanism of claim 1, wherein the counter balancer driving portion includes:
a moving base frame fixedly mounted at the base link;
a moving block linearly moving on the moving base frame and contacting the delivery roller; and
a moving elastic portion elastically supporting the moving block toward the delivery crank portion.

3. The counterbalancing linkage mechanism of claim 2, wherein the moving elastic portion includes:
a moving elastic shaft fixedly mounted at the moving block and extending along a moving direction of the moving block; and
a moving elastic member covering an external circumference of the moving elastic shaft and disposed between the moving base frame and the moving block.

4. The counterbalancing linkage mechanism of claim 3, wherein the counter balancer driving portion further includes:
a moving motion block attached to the moving block; and
a moving motion rail connected to the moving motion block and relatively moving with each other in which the moving motion rail is parallel with the moving elastic shaft.

5. The counterbalancing linkage mechanism of claim 3, wherein the moving block includes:
a moving block body mounted at the moving motion block; and
a moving block plate attached to the moving block body and contacting the delivery roller.

6. The counterbalancing linkage mechanism of claim 1, wherein the second link includes:
a second upper link having one end rotatably connected to the base link and the opposite end rotatably connected to the third link; and
a second lower link having one end rotatably connected to the base link and the opposite end rotatably connected to the third link, the second lower link spaced apart from the second upper link.

7. The counterbalancing linkage mechanism of claim 6, further comprising:
a support driver supplying a driving torque to the second upper link.

8. The counterbalancing linkage mechanism of claim 7, wherein the second lower link is connected to the counter balancer delivery portion.

9. The counterbalancing linkage mechanism of claim 8, wherein the delivery gear portion rotates together with the second link, and
wherein the delivery gear portion includes:

a delivery lower gear coaxially connected to the second lower link; and a delivery upper gear engaged with the delivery lower gear and coaxially connected to the delivery crank portion.

10. The counterbalancing linkage mechanism of claim 6, wherein a second upper joint portion is formed at one end of the second upper link and is rotatably connected to the base link, a second lower joint portion is formed at one end of the second lower link and is rotatably connected to the base link, a third upper joint portion is formed at the opposite end of the second upper link and is rotatably connected to the third link, and a third lower joint portion is formed at the opposite end of the second lower link and is rotatably connected to the third link.

11. The counterbalancing linkage mechanism of claim 10, further comprising:

a fourth link connected to one end portion of the third link and moving on a plane perpendicular to a length direction of the third link.

12. The counterbalancing linkage mechanism of claim 11, further comprising:

a fifth link disposed at an end portion of the fourth link, wherein the fifth link is moved on a plane in parallel with a length direction of the fourth link.

13. The counterbalancing linkage mechanism of claim 12, further comprising:

a sixth link connected to an end portion of the fifth link, wherein the sixth link rotates base on a rotation axis of the length direction of the fifth link.

14. The counterbalancing linkage mechanism of claim 1, further comprising:

a base driver supplying a driving torque to the first joint.

* * * * *